United States Patent

Greiner

[15] 3,642,059
[45] Feb. 15, 1972

[54] HEATING AND COOLING UNIT

[72] Inventor: Leonard Greiner, 2805 Lorenzo Ave., Costa Mesa, Calif. 92626

[22] Filed: June 30, 1969

[21] Appl. No.: 837,687

[52] U.S. Cl. .................................. 165/2, 165/105, 62/476
[51] Int. Cl. ........................................................ F25b 13/00
[58] Field of Search ...................................... 165/105, 67, 2; 62/476–480

[56] References Cited

UNITED STATES PATENTS

| | | | |
|---|---|---|---|
| 2,144,441 | 1/1939 | Schlumbohm | 62/480 |
| 2,288,341 | 6/1942 | Addink | 165/105 |
| 3,196,634 | 7/1965 | Rich | 62/394 |

*Primary Examiner*—Charles Sukalo
*Attorney*—Patience K. Bethel

[57] ABSTRACT

A heating and cooling apparatus comprising two vessels connected by a conduit, the first containing a vaporizable liquid, e.g. water, and the second containing a vapor-absorptive chemical, e.g. $Na_2O$, so that the liquid evaporates from the first vessel and its vapors, in effect, are drawn by the vapor-absorptive chemical through the conduit to the second vessel where they are absorbed and condensed with the consequent cooling of the first vessel through heats of vaporization and heating of the second vessel through heats of vapor absorption. Additionally, a process for heating and cooling comprising providing a vaporizable liquid and a vapor-absorptive chemical, placing said liquid and said chemical into proximate relationship resulting in evaporation of said liquid with the formation of vapors and the substantially simultaneous cooling of said liquid, passing said vapors from the vicinity of said liquid to the vicinity of said chemical to permit absorption and condensation of said vapors by said chemical and substantially simultaneous heating of said chemical.

8 Claims, 1 Drawing Figure

PATENTED FEB 15 1972 3,642,059
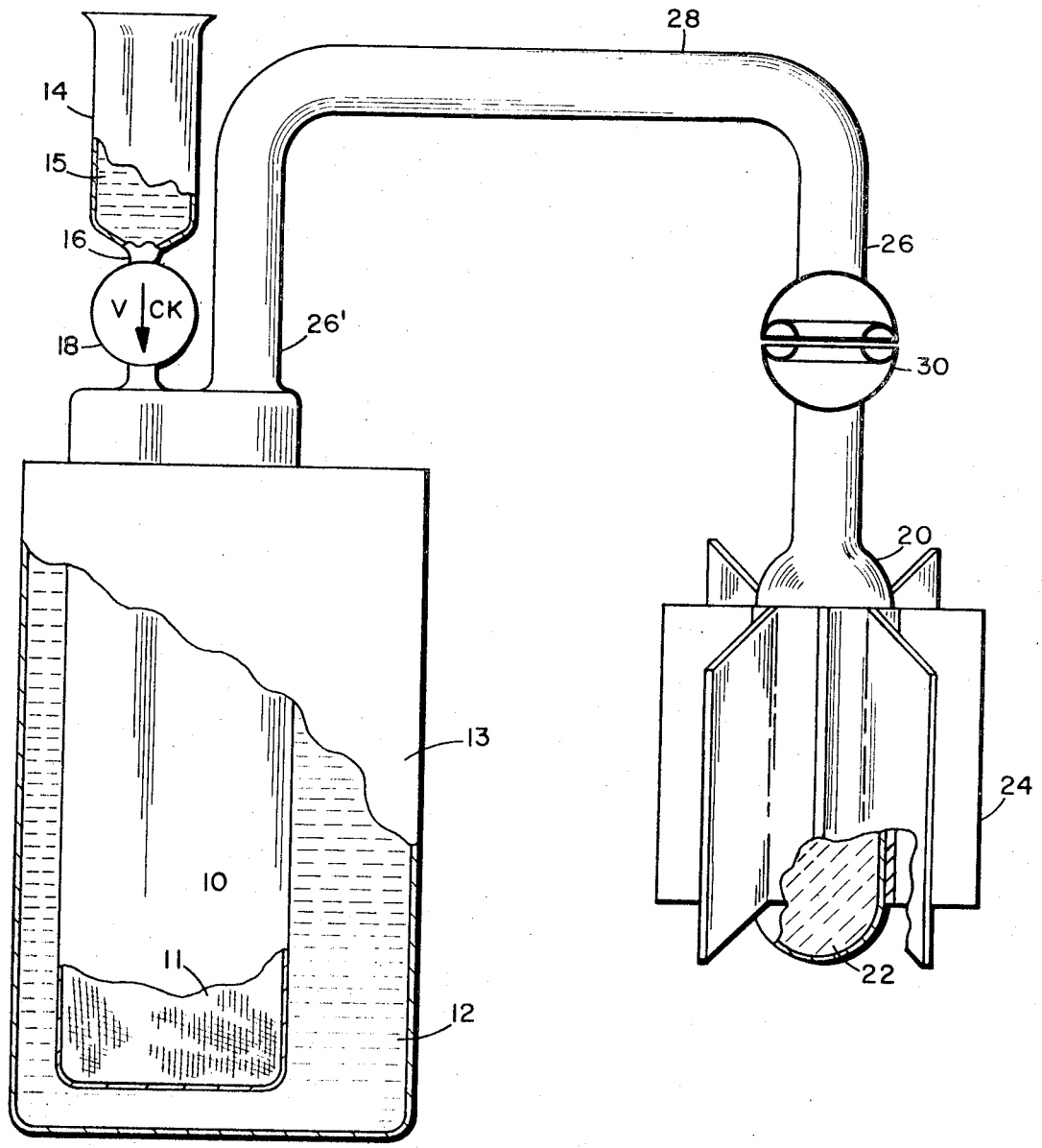
INVENTOR.
LEONARD GREINER
BY *Patence H. Bethel*
AGENT

HEATING AND COOLING UNIT

FIELD OF THE INVENTION

This invention relates to heating and cooling apparatus and particularly to a device employing the action of a vapor-absorptive chemical on vapors of an appropriate vaporizable liquid to effect such heating and cooling.

A process for heating and cooling by chemical means substantially without moving parts is also provided.

DESCRIPTION OF THE PRIOR ART

Various apparatuses are available which provide refrigeration and heating but these usually consist of complicated machines requiring electrical or other forms of external energy for operation. There is no simple, safe, inexpensive, lightweight portable device which can be used for cooling or heating such as would be required in isolated areas devoid of electricity, gas or other conventional forms of energy. These occasions would be encountered on camping trips, long automobile trips, and the like. Such a device could be used to remove heat from portable life support systems such as carbon dioxide absorbers used in closed cycle air supplies and the like, to heat or cool liquids for drinking and for many other uses where conventional cooling systems are not available or are impractical.

SUMMARY OF THE INVENTION

The above desirable aspects have now been embodied in a simple, lightweight, portable heating and cooling unit which operates without moving parts and does not require electricity or conventional fuels. The apparatus or unit comprises a first vessel containing a vaporizable liquid, e.g., water, a second vessel containing a vapor-absorptive chemical and an interconnecting conduit joining the two vessels. The apparatus which normally is substantially closed to the atmosphere operates by evaporation of liquid from the first vessel which vapor is drawn by the absorptive chemical through the connecting conduit to the second vessel where it is absorbed and condensed by the chemical causing substantially simultaneous cooling of the first vessel through heats of vaporization and heating in the second vessel through heats of vapor absorption. The inventive principle which permits operation of the apparatus is the fact that the equilibrium partial pressure of the liquid, i.e., liquid vapor pressure, over the first vessel is greater than the equilibrium partial pressure of the liquid over the second vessel containing the vapor-absorptive chemical. As a consequence, the liquid evaporates absorbing its heat of evaporation and is drawn in vapor form to the vessel containing the vapor absorptive chemical, there liberating both its heat of absorption and its heat of vaporization.

As a further aspect of the invention a process for heating and cooling is provided which comprises providing a vaporizable liquid and a vapor-absorptive chemical; placing said liquid and said chemical into proximate relationship resulting in evaporation of said liquid with the formation of vapors and substantially simultaneous cooling of said liquid; passing said vapors from the vicinity of said liquid to the vicinity of said chemical to permit absorption and condensation of said vapors by said chemical and substantially simultaneous heating of said chemical.

Thus, the invention provides a simple, convenient, portable heating and cooling device which does not produce gas liberation or a liquid melt. Cooling can be more efficient than produced by melting ice; heating by means of the apparatus does not involve combustion.

The only expendable materials required for operation of the heating and cooling unit of the invention are the vaporizable liquid, e.g., water, and the vapor-absorptive chemical, e.g., $Na_2O$. Both these materials are often quite inexpensive and readily available.

According to an embodiment to be subsequently discussed at greater length, the expendable chemicals when depleted can be easily replaced. This is readily accomplished, for example, by exchange of fresh canisters containing new chemicals for depleted ones. Depending on the type of vaporizable liquid and absorptive chemicals selected, it is possible to regenerate and reuse the chemicals as by heating to remove the absorbed, condensed vapors, and if desired, to cool and recollect the vapors for reuse in the liquid chamber. Cost savings are therefore possible along with improved overall convenience.

DESCRIPTION OF THE DRAWING

The invention will be more clearly understood by reference to the description below taken in connection with the accompanying drawing wherein:

The sole FIGURE is a schematic partially fragmented representation of an embodiment of the invention.

DETAILED DESCRIPTION OF THE INVENTION

Referring now to the drawing, there is shown a flattened, hollow, elongated cooling chamber 10, e.g., of metal, containing a wicking element 11, e.g., of felt, adhering to its inner walls. The chamber 10 is shown immersed in a fluid 12 held by a container 13 for colling thereof. A reservoir 14 containing a vaporizable liquid 15 communicates with the cooling chamber 10 by means of a pipe 16. The flow of liquid 15, e.g., water, into the cooling chamber 10 is regulated by a valve 18 in the pipe 16. A cartridge or canister 20, e.g., of metal, contains a vapor-absorptive chemical 22, e.g., $Na_2O$, which is surrounded by a finned receptacle 24 for dissipation of heat from the cartridge 20 by means of air convection currents. The cartridge 20 in turn communicates with one end 26 of a conduit 28, e.g., of plastic, by a separable connection 30. The separable connection can be provided in any suitable manner such as a bayonet-type connection or puncture-sealing type so that disposable type canister or cartridge 20 can be interchanged easily. The opposite end 26' of the conduit 28 communicates with the cooling chamber 10 providing communication between the cooling chamber 10 and the cartridge 20.

In operation as a cooling device, the cooling chamber 10 is placed in contact with or in close proximity to the object to be cooled, for example as shown in FIG. 1 by immersion of the cooling chamber 10 in a fluid 12. The fluid can comprise, for example, air or an airstream to effect refrigeration or a liquid such as water for drinking. At the same time the cartridge 20 is kept at a distance away from the item to be cooled. The valve 18 is opened to permit the vaporizable liquid 15, e.g., water, from the reservoir 14 to flow through the pipe 16 into the cooling chamber 10 wetting the wicking element 11. The vapor-absorptive chemical 22, e.g., $Na_2O$, exerts an influence such that the partial pressure of liquid, e.g., water, in the apparatus is less than the vapor pressure of the liquid, e.g., water, entering the system. This condition results in spontaneous escape as evaporation of liquid 15 from the chamber 10, which vapor is drawn through the conduit 28 to the chemical 22 in the cartridge 20 where it is absorbed and retained. Evaporation of liquid from the cooling chamber 10 is highly endothermic. The heat necessary for this evaporation is obtained by heat transfer through the walls of the chamber 10 from the area surrounding the chamber 10 and specifically from the object or area being cooled, e.g., from the fluid 12. The surrendering of heat by the object or area to be cooled results in the desired cooling.

The above-described cooling process is continuous because the liquid vapor produced by evaporation has a higher equilibrium partial pressure i.e., the liquid vapor pressure, than that of the liquid vapor over the vapor-absorptive chemical 22. Termination of the process occurs when one or more of the following takes place: (1) the object or area to be cooled becomes sufficiently cold that the temperature of the liquid in the wicking element is so low that its vapor pressure is greatly reduced, and (2) when the vapor-absorptive chemical is saturated with liquid to a point where at the temperature conditions of the saturated chemical the equilibrium partial pressure of liquid vapor over the chemical has risen until it is no longer less than that of the liquid vapor originating over the wicking element.

For purposes of convenience, the invention will be further discussed and illustrated using water as the vaporizable liquid and sodium monoxide as its vapor-absorptive chemical. It should be understood, however, that other vaporizable liquids and other vapor-absorptive chemicals can be used to obtain substantially the same cooling and heating effects as subsequently discussed in greater detail.

The course of reaction of the vapor-absorptive chemical, Na$_2$O (sodium monoxide) with water as the vaporizable liquid can be illustrated generally. Water vapor is first absorbed by the chemical to produce sodium hydroxide then sodium hydroxide monohydrate and finally an aqueous solution of sodium hydroxide as shown below: Na$_2$O $\xrightarrow{H_2O\ (vapor)}$ 2NaOH $\xrightarrow{H_2O\ (vapor)}$ 2NaOH·H$_2$O $\xrightarrow{H_2O\ (vapor)}$ 2NaOH (aqueous)

The absorption of water by the vapor-absorptive chemical is exothermic so that the cartridge 20 becomes hot. At a given ratio of water to vapor-absorptive chemical the equilibrium partial pressure of the water vapor over the vapor-absorptive chemical increases with the temperature of the chemical. This means that more water is absorbed by the chemical at lower temperatures. Therefore, for greatest cooling efficiency, the temperature of the vapor absorptive chemical is desirably kept at a minimum.

It has been found that satisfactory cooling of the chemical and cartridge 20 is effected by means of a finned receptacle 24 as shown in FIG. 1. Convection currents of air passing the fins carry the heat away. Alternately, a grill can be used, as can immersion of the cartridge or canister 20 in water. On camping trips, for example, immersion of the cartridge 20 in a stream or lake can be resorted to. In automobile trips, cartridge 20 can be located in a velocity-induced airstream. Other heat-dissipating means will be obvious to those skilled in the art. For example, the finned receptacle 24 can be combined with the cartridge 20 as an integral heat-dissipating element. Specifically, the cartridge 20 with the fins 24 removed can be substa..'ially flattened to form a flat packet or envelope configuration similar to the cooling chamber 10 having a large surface area compared to its volume. Preferably, the temperature of the cartridge 20 is kept at 120° C. or below. This is easily attained by employment of any of the above-mentioned heat-dissipating means.

Using the apparatus substantially as described in FIG. 1 for cooling wherein sodium monoxide is employed and the temperature of cartridge 20 does not exceed about 120° C., then approximately 0.72 g. of water will evaporate from the cooling chamber 10 per gram of sodium monoxide as next indicated. In this case, the vapor pressure of water in the cooling chamber 10 is about 4.6 mm. of mercury when the cooling temperature, i.e., that of the water, is 0° C. In the cartridge 20, the equilibrium partial pressure of a mixture of 0.72 g. of water and 1 g. of sodium monoxide is only about 2.7 mm. mercury so that evaporation from chamber 10 and condensation of water vapor in cartridge 20 will take place to provide at least this concentration of water in cartridge 20. Since each gram of water evaporated absorbs 0.58 kcal. of heat, then 0.72 g. × 0.58 kcal./g. or 0.42 kcal. of heat is absorbed by the unit per gram of sodium monoxide. The efficiency here is best appreciated when it is considered that only 0.08 kcal. of heat is absorbed per gram of melting ice. By maintaining the temperature of the cartridge 20 at even lower temperatures, such as by immersion of the cartridge 20 in a water stream or lake or in a fast moving stream of cool air, even greater efficiency is realized. For example, if the cartridge 10 is maintained at about 100° C. and below, then approximately 0.47 kcal. of heat is absorbed per gram of sodium monoxide, and if maintained as low as 20° C. then approximately 1.11 kcal. will be absorbed per gram of sodium monoxide.

In using the device for heating purposes, substantially the same procedure is followed except that the object or area to be heated is placed in proximity or contact with the cartridge 20 instead of the cooling chamber 10. Fluids can be heated, for example, by immersion of the cartridge 20 therein to form an oven where the fluid is air or direct heating of liquids such as water or soup. In the above instance, the heat of evaporation of the vaporizable liquid is added to the heat of vapor absorption providing much greater heat energy then is possible if the liquid were provided in liquid instead of vapor form which is a further novel feature of the invention. For maximum efficiency, the cooling chamber 10 is preferably but not necessarily immersed in water as a source of energy for evaporating the enclosed vaporizable liquid instead of relying on air convection currents.

Heating is produced under substantially the same conditions as for the cooling operation. The following illustration employs water as the vaporizable liquid and Na$_2$O as the vapor-absorptive chemical. When the sodium monoxide is maintained at 120° C. or below and the water is vaporized from the cooling chamber 10 at about 0° C. then in the heating operation approximately 1.12 kcal. of heat is supplied per gram of sodium monoxide. If the temperature of the chemical is held at a temperature below 20° C. as in merely heating an object to about room temperature, then approximately 2.03 kcal. of heat is supplied per gram of sodium monoxide. In contrast under the latter conditions if water as a liquid instead of as a vapor is added to the chemical only 0.90 kcal. is supplied per gram of sodium monoxide.

Various other vapor-absorptive chemicals can be used in place of the sodium monoxide in conjunction with water, and other appropriate vaporizable liquids in place of water in the heating and cooling unit according to the invention. The only requirement is that such chemicals provide an equilibrium partial pressure of the vaporizable liquid vapor over the vapor-absorptive chemical which is less than that of the vaporizable liquid vapor originating in the cooling chamber. Preferably also such materials should not produce dangerous unstable reaction products.

Preferred materials for use with water as the liquid are those which provide an equilibrium partial pressure over water of less than about 20 mm. mercury. Examples of such materials include among others chemicals selected from the group consisting of sodium monoxide, lithium monoxide, calcium oxide, calcium chloride, magnesium chloride, phosphorus pentoxide, sodium hydroxide, lithium hydroxide, magnesium perchlorate, silica gel, shotted urea, activated alumina, sulfuric acid, ammonium nitrate and compatible mixtures thereof.

Of the above-mentioned materials, powdered sodium monoxide is often the most preferred for use with water as the vaporizable liquid because it combines low cost, availability and efficiency. Other preferred materials for use with water include calcium chloride, lithium hydroxide, and silica gel because these materials, also relatively inexpensive, can be regenerated and reused by removal of the water.

Examples of vaporizable liquids other than water include among others anhydrous ammonia, carbon dioxide, methyl alcohol and other alcohols, aqueous ammonia solutions etc., and mixtures thereof. Each vaporizable liquid must be matched with an absorptive chemical which absorbs vapors from the aforementioned liquids, such as for example sulfuric acid of H$_2$O for ammonia, sodium monoxide for methyl alcohol, sodium hydroxide for carbon dioxide etc.

Many other vaporizable liquids can be used in addition to those mentioned together with suitable vapor-absorptive chemicals as above described to effect heating and cooling according to the invention. By the term "vaporizable liquid" as used in the specification and claims is meant a liquid having a vapor pressure of at least 20 mm. mercury under ambient conditions. Vaporizable liquids having a normal vapor pressure greater than 760 mm. mercury (1 atm.) can be confined in a closed cartridge or equivalent container.

In using solid vapor-absorptive materials, it has been found that, in general, the greatest efficiency is realized when such materials are in the finely divided or powdered state. Therefore, powdered or granulated materials are preferred over pellets or agglomerated forms.

While the embodiment illustrated by the drawing constitutes one form of the heating and cooling unit of the invention, various other embodiments are possible without departing from the invention.

The wicking element 11, for example, can be of felt, natural or synthetic fibers, glass fibers, metal whiskers and the like. These can be in the form of a bundle of fibers or a loosely twisted, braided or woven cord. Similarly, a sponge of ceramic, natural or synthetic rubber, foamed plastic, or a metal sponge formed by foaming a melt of the metal can be employed. As used herein and in the appended claims, the term "wicking element" is meant to include any element which will "draw" the vaporizable liquid by capillary attraction. In some cases the inner surface of chamber 10 will act in this fashion if appropriately "wetted" by the liquid. Alternately, the liquid can be introduced as a spray or atomized to produce a fog. The use of a wicking element is, therefore, preferred but not necessary to the operation of the apparatus.

A valve 18 in communication with liquid reservoir 14 is shown in FIG. 1 for purposes of regulating the flow of vaporizable liquid into the cooling chamber 10. Such a valve is not necessary but improves the effectiveness and usefulness of the unit. For greater convenience such valve can be responsive to the temperature in the cooling chamber 10 so that the proper amount of liquid will be automatically supplied continuously or intermittently to the cooling chamber 10.

In lieu of the valve 18 and liquid reservoir 14 arrangement of FIG. 1, the wicking element 11 can simply extend from the cooling chamber 10 and have its end immersed in the vaporizable liquid 15. The capillary action of the wick will provide sufficient liquid to the cooling chamber 10 so long as the length of the wick is not excessively long, for example not more than several feet.

It is preferred that the material of the cooling chamber 10 and of the cartridge or canister 20 be of a high heat transfer material such as a metal so that the heating and cooling effects can be maximized. The interconnecting conduit 28 is preferably of a low heat transfer material such as a plastic to prevent or minimize heat or cold from being conducted back and forth between chamber 10 and cartridge 20. Also, it is recommended that excessively long lengths of conduit 28 be avoided for efficient operation. This length preferably should not exceed about 1 foot.

In order to speed up the cooling process and if desired to quickly get it started, a means for providing reduced pressure in the connecting conduit 28 such as a hand-operated or automatic evacuation pump can be fitted to a T in the connecting conduit 28. The unit, however, will operate without it.

The apparatus should be substantially closed to the atmosphere for efficient operation but in this respect completely airtight seals are not necessary, especially if the above-mentioned pump is used.

In FIG. 1, the cooling chamber 10 is shown in the form of a flattened long metal tube which provides a large surface area for transfer of heat and cold and intimate contact with the wicking element 11 where evaporation takes place. Such an arrangement constitutes one design of the cooling chamber but other designs can be used as well. For example, the cooling chamber can be a refrigerator comprising a first walled chamber for containing objects to be cooled and a second walled chamber surrounding the first chamber in spaced relationship therefrom. The walls of the two chambers provide a peripheral compartment for containing the vaporizable liquid. Substantially the same arrangement can be used to effect an oven for heating objects wherein the peripheral compartment contains the vapor-absorptive chemical.

The heating vessel in the form of the cartridge 20 is but one embodiment and other designs can be used with success. Here, a cartridge or canister is preferred which is separably connected to the conduit 28 for purposes of simplifying replacement of the depleted chemical with fresh chemical. As discussed previously, the fresh chemical can, for example, be supplied in a hermetically sealed can or cartridge which is disposable and which easily replaces the existing depleted cartridge.

A finned receptacle 24 is shown in FIG. 1 to dissipate heat from canister 20 by air convection currents. Alternatively, a grill or other heat exchange design can also be used. If desired, the cartridge 20 can be immersed in a bucket of water, in a stream of air or water, or surrounded by a jacket containing circulating water. When immersed in a liquid, the unit can be used to directly heat liquids such as water for coffee, soups etc. Such heating can be utilized at the same time that other objects or fluids are being cooled by chamber 10.

As noted previously, the invention also provides a process for heating and cooling comprising providing a vaporizable liquid and a vapor-absorptive chemical, placing said liquid and said chemical into proximate relationship resulting in evaporation of said liquid with the formation of vapors and the substantially simultaneous cooling of said liquid, and passing said vapors from the vicinity of said liquid to the vicinity of said chemical to permit absorption and condensation of said vapors by said chemical and substantially simultaneous heating of said chemical. The vaporizable liquid and vapor-absorptive chemical are as defined supra.

Thus, the novel heating and cooling apparatus of the invention provides efficient heating and cooling by a novel chemical process. Various modifications are contemplated and may be resorted to by those skilled in the art without departing from the spirit and scope of the invention as defined by the following appended claims.

I claim:
1. A heating and cooling apparatus comprising:
   a first vessel composed of a heat transfer material and containing a vaporizable liquid selected from the group consisting of water, anhydrous ammonia, carbon dioxide, alcohols, aqueous ammonia solutions, and mixtures thereof;
   a second vessel composed of a heat transfer material containing a vapor-absorptive chemical selected from the group consisting of sodium monoxide, lithium monoxide, calcium oxide, calcium chloride, phosphorous pentoxide, sodium hydroxide, lithium hydroxide, magnesium perchlorate, magnesium chloride, silica gel, shotted urea, activated alumina, sulfuric acid, $H_2O$, ammonium nitrate, and mixtures thereof;
   heat-dissipating means in contact with said second vessel to prevent the temperature of said second vessel and said vapor-absorptive chemical from rising substantially above about 120° C.;
   a conduit joining said vessels;
   said conduit and vessels being in substantially closed relationship with respect to the atmosphere so that said vaporizable liquid evaporates from said first vessel and passes in vapor form through said conduit to said second vessel by the action of said vapor-absorptive chemical with the consequent cooling of said first vessel and heating of said second vessel.
2. The apparatus of claim 1 further comprising:
   a wicking element disposed in said first vessel;
   said heat-dissipating means is selected from the group consisting of a finned receptacle, a grill, surrounding said second vessel with water, and a large surface area of said second vessel compared with its volume.
3. The apparatus of claim 2 wherein the normally solid vapor-absorptive chemicals are in powder form, and
   said wicking element is in communication with a vaporizable liquid reservoir outside said first vessel;
   and further comprising
   a separable connection between said second vessel and said conduit to provide easy exchange of fresh vapor-absorptive chemical for liquid-saturated chemical;
   said vaporizable liquid is water and said vapor-absorptive chemical is one which provides an equilibrium partial pressure over water of less than about 20 mm. mercury.

4. The apparatus of claim 3 wherein said vaporizable liquid is water and said vapor-absorptive chemical is sodium monoxide.

5. The apparatus of claim 3 further comprising:
means for providing reduced pressure disposed in said conduit; and
means disposed in said liquid reservoir for regulating the flow of vaporizable liquid from said liquid reservoir into said first vessel, and wherein
said first and second vessels are composed of a high heat transfer material; and
said conduit is composed of a low heat transfer material;
said vaporizable liquid is water and said vapor-absorptive chemical is magnesium chloride.

6. The apparatus of claim 5 wherein:
said liquid flow regulating means is responsive to the temperature in said first vessel; and
said first vessel is in the form of a flat, elongated metal tube.

7. A process for heating and cooling comprising:
providing a vaporizable liquid and a vapor-absorptive chemical;
placing said liquid and said chemical into proximate relationship resulting in evaporation of said liquid with the formation of vapors and the substantially simultaneous cooling of said liquid;
passing said vapors from the vicinity of said liquid to the vicinity of said chemical to permit absorption and condensation of said vapors by said chemical and substantially simultaneous heating of said chemical;
providing heat-dissipating means to said vapor-absorptive chemical to prevent the temperature thereof from rising substantially above about 120° C. during absorption of said vapors.

8. The apparatus of claim 2 wherein said wicking element is provided by the inner surface of said first vessel;
said first and second vessels are in the form of a thin, flat configuration providing a large surface area compared to the volume thereof;
and said vaporizable liquid is water and said vapor-absorptive chemical is magnesium chloride;
said apparatus having substantially airtight seals and reduced interior pressure relative to atmospheric pressure.

* * * * *